United States Patent [19]

Lew

[11] Patent Number: 5,003,825
[45] Date of Patent: Apr. 2, 1991

[54] DIGITAL PRESSURE SENSOR

[76] Inventor: Hyok S. Lew, 7890 Oak St., Arvada, Colo. 80005

[21] Appl. No.: 39,383

[22] Filed: Apr. 17, 1987

[51] Int. Cl.$^5$ ............................................. G01L 11/00
[52] U.S. Cl. ........................................................ 73/704
[58] Field of Search ................. 73/701, 700, 702, 704, 73/715, 716, 717, 723, 729, 728, 580, 581, DIG. 1

[56] References Cited

U.S. PATENT DOCUMENTS

| | | | |
|---|---|---|---|
| 2,447,817 | 8/1948 | Rieber | 73/704 |
| 2,959,965 | 11/1960 | Holmes | 73/704 |
| 2,969,677 | 1/1961 | Lewis | 73/704 |
| 3,019,641 | 2/1962 | Shapiro | 73/704 |
| 3,079,800 | 3/1963 | Hoar | 73/704 |
| 3,478,594 | 11/1969 | Love | 73/704 |
| 3,721,127 | 3/1973 | Garcea | 73/715 |
| 4,255,973 | 3/1981 | Karplus | 73/704 |
| 4,343,180 | 8/1982 | Herden et al. | 73/717 |
| 4,476,725 | 10/1984 | Chorel et al. | 73/704 |
| 4,667,097 | 5/1987 | Fasching et al. | 73/705 |

FOREIGN PATENT DOCUMENTS 2144067 3/1973 Fed. Rep. of Germany ........ 73/702

Primary Examiner—Robert Raevis

[57] ABSTRACT

This invention discloses a differential or absolute pressure sensing apparatus that measures pressure exerted on a mechanical pressure sensing element in digitized electrical signals, which comprises two pressure receiving compartments separated from one another by a diaphragm or disc secured to two tension wires extending therefrom in two opposite directions and anchored at two extremities thereof, wherein electromagnetic vibrators intermittently induce vibration of the tension wires and vibration detectors measure the natural frequencies of vibrations of the two tension wires. The difference in pressures on two sides of the diaphragm or disc is proportional to the difference in the square of the natural frequencies of the two tension wires and, consequently, the differential pressure across the diaphragm or disc is obtained by measuring the natural frequencies of vibrations of the two tension wires. When one side of the diaphragm or disc is evacuated, the absolute pressure is measured.

14 Claims, 3 Drawing Sheets

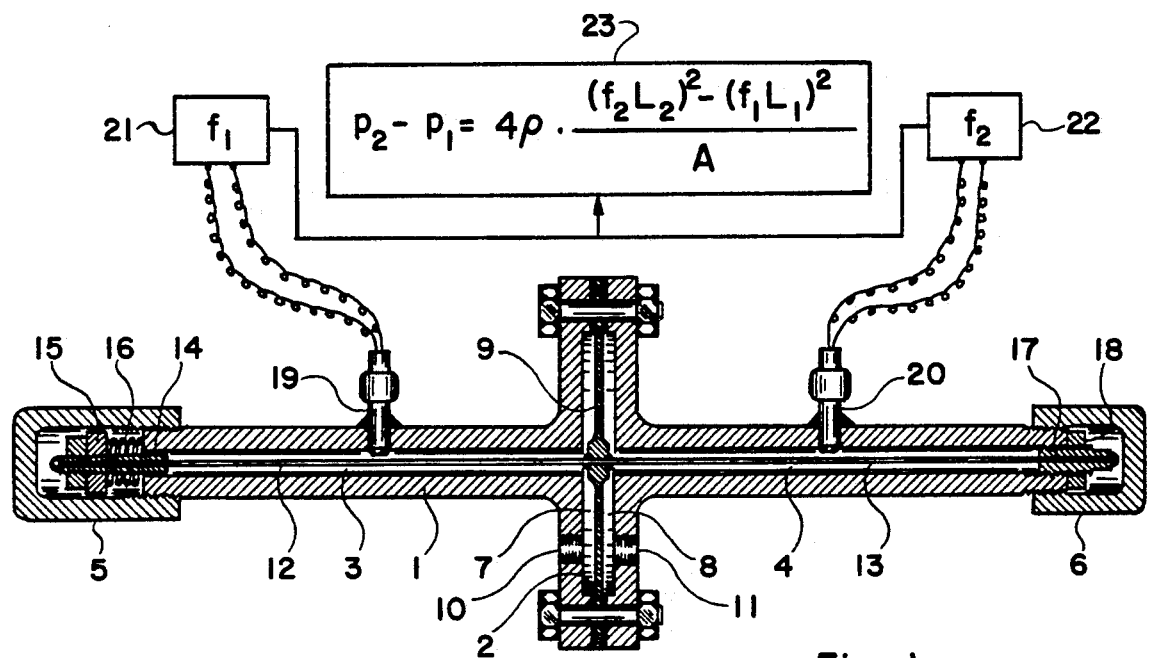
Fig. 1
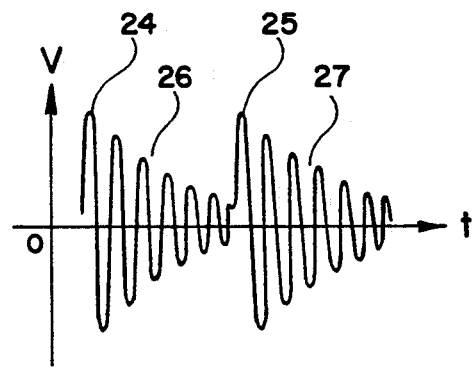
Fig. 2
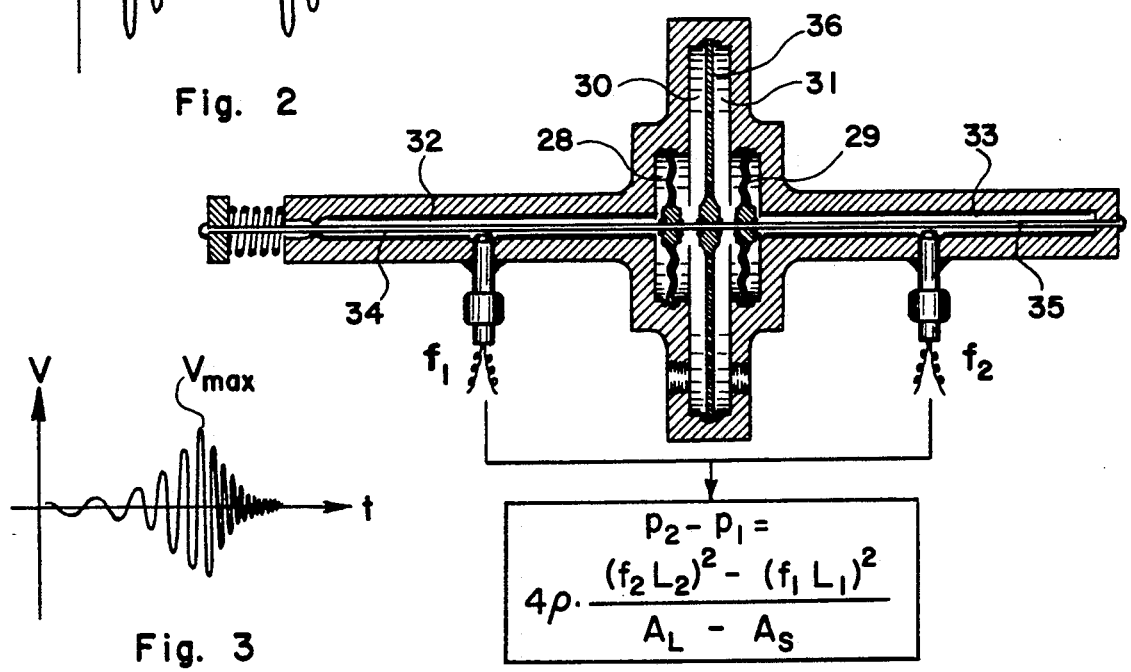
Fig. 3
Fig. 4

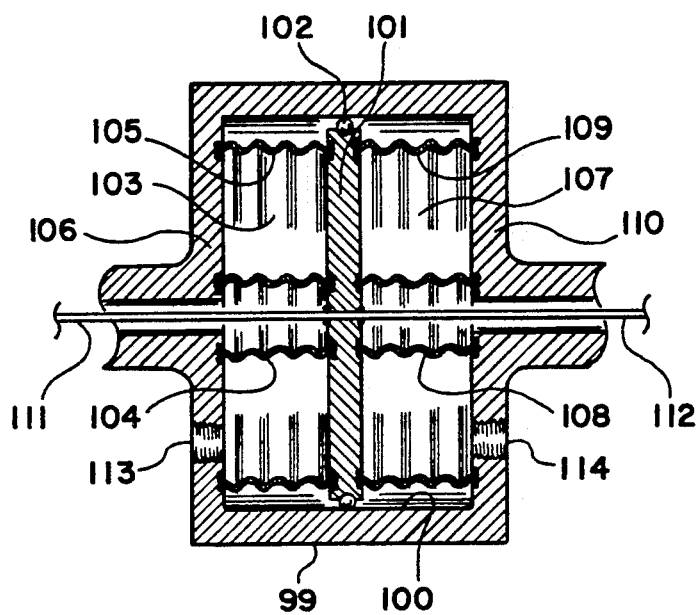
Fig. 10
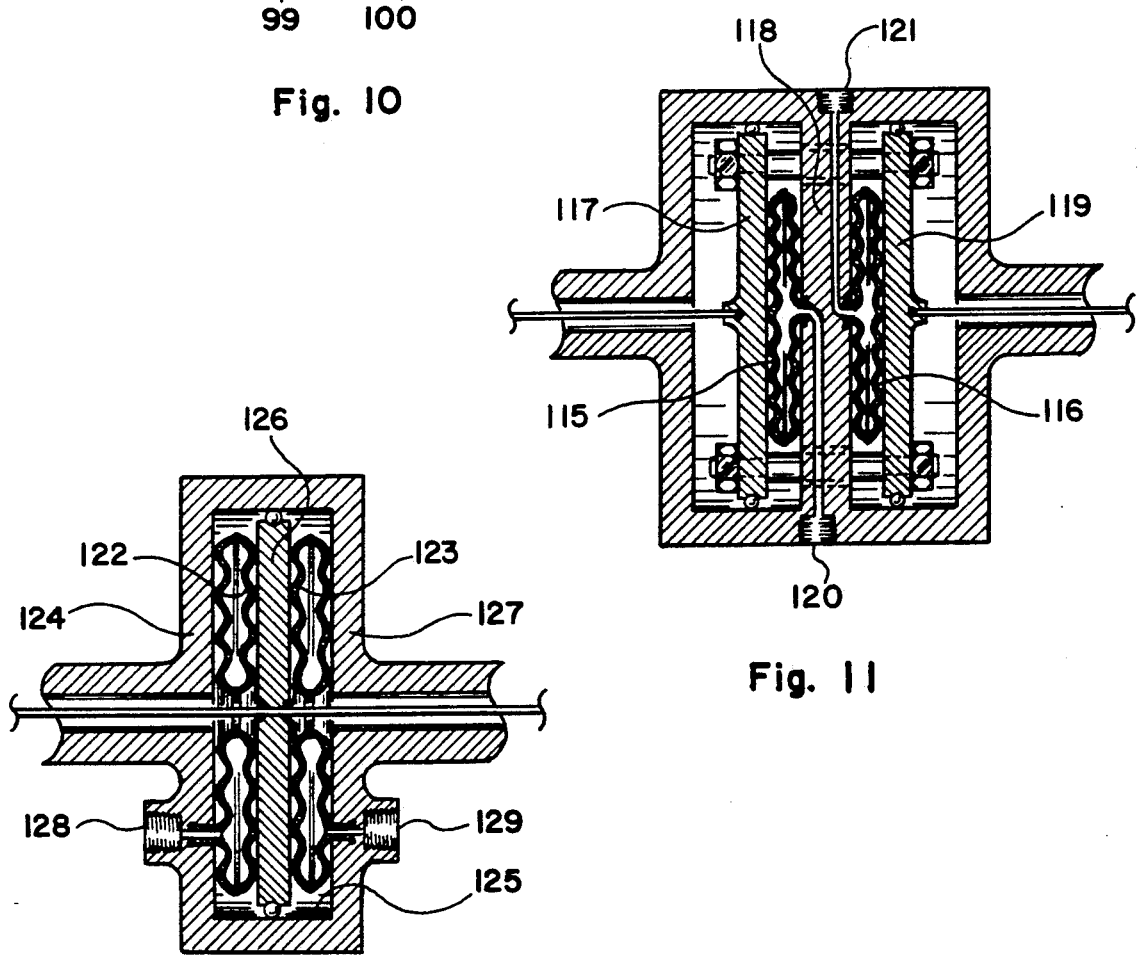
Fig. 11
Fig. 12

DIGITAL PRESSURE SENSOR

BACKGROUND OF THE INVENTION

As the automations in the chemical, pharmaceutical and mineral processing industries have become standard rather than exception, demand for good pressure sensors has skyrocketed. Most of the pressure sensing devices available in the present day market are analog types which transmit information on the pressure measurement as continuously varying electromotive force. As proven by the superiority displayed by the modern digital electronic circuits over the now obsolete analog circuits, a digital pressure sensing device provides many advantages over the existing analog pressure sensing devices. The drift of the calibration reference, change in the amplification factor and inconsistency in the conversion of the mechanical signals to the electronic signals are only a few of those disadvantages inherent to the analog pressure sensing device. A truly digital pressure sensor must convert the continuously varying pressure signals to digital signals inherent to the mechanical arrangement of the pressure sensing assembly rather than electronically converting the analog electrical signal to the digital form. In other words, the digital nature of the information obtained by a digital pressure sensor must originate from the very source of mechanical phenomena representing the information on the pressure rather than the electronic processor that artificially converts the original signal of analog nature into digital form.

BRIEF SUMMARY OF THE INVENTION

The primary object of the present invention is to provide a digital pressure sensor wherein the digital nature of the pressure signals originate from the very mechanical source of the pressure signals rather than an electronic data processor.

Another object is to provide a digital pressure sensor that is compact, light weight and economically priced.

A further object is to provide a digital pressure sensor suitable for field installation.

Yet another object is to provide a digital pressure sensor comprising two pressure receiving chambers separated from one another by an easily deflecting partition such as a diaphragm or disc having little resistance against lateral deflection thereof, which easily deflecting partition is supported by a pair of wires under tension extending therefrom in two opposite directions and secured at the extremities of the wires opposite to those anchored to the easily deflecting partition.

Yet a further object is to provide a digital pressure sensor including means for inducing vibrations of the two wires under tension and means for detecting natural frequencies of vibrations of the two wires under tension, wherein the difference in the pressures on two opposite sides of the easily deflecting partition is derived from the natural frequencies of vibrations of the two wires under tension.

Still another object is to provide a digital pressure sensor comprising a plurality of pairs of pressure receiving chambers separated from one another by a deflective partition, which pressure receiving chambers are disposed in series; wherein the deflective partitions connected to each other by at least one axial structural member are supported by two wires under tension extending therefrom in two opposite directions and secured at the extremities of the wires opposite to those anchored to the combination of the deflective partitions.

Still a further object is to provide a digital pressure sensor comprising two pressure receiving chambers separated by a partitioning wall, wherein two deflective walls respectively included in the two pressure receiving chambers disposed in a generally parallel relationship to one another and connected to one another by at least one axial structural member extending through the partitioning wall are supported by two wires under tension extending from the combination of the two deflective walls in two opposite directions and secured at the extremities of the wires opposite to those anchored to the combination of the two deflective walls.

These and other objects of the present invention will become clear as the description thereof proceeds.

BRIEF DESCRIPTION OF THE FIGURES

The present invention may be described with a great clarity and specificity by referring to the following figures:

FIG. 1 illustrates a cross section of an embodiment of the digital pressure sensor of the present invention.

FIG. 2 illustrates a mode of vibration usable in conjunction with the present invention for detecting natural frequencies of vibrations of the two tension wires.

FIG. 3 illustrates another mode of vibration usable in conjunction with the present invention for detecting natural frequencies of vibrations of the two tension wires.

FIG. 4 illustrates a cross section of another embodiment of the digital pressure sensor of the present invention.

FIG. 10 illustrates a cross section of still a further embodiment of the digital pressure sensor of the present invention.

FIG. 11 illustrates a cross section of an embodiment of the digital pressure sensor of the present invention that employs a pair of pancake type diaphragm capsules.

FIG. 12 illustrates a cross section of an embodiment of the digital pressure sensor of the present invention that employs a pair of doughnut type diaphragm capsules.

DESCRIPTION OF THE ILLUSTRATED EMBODIMENTS

Figure 5:
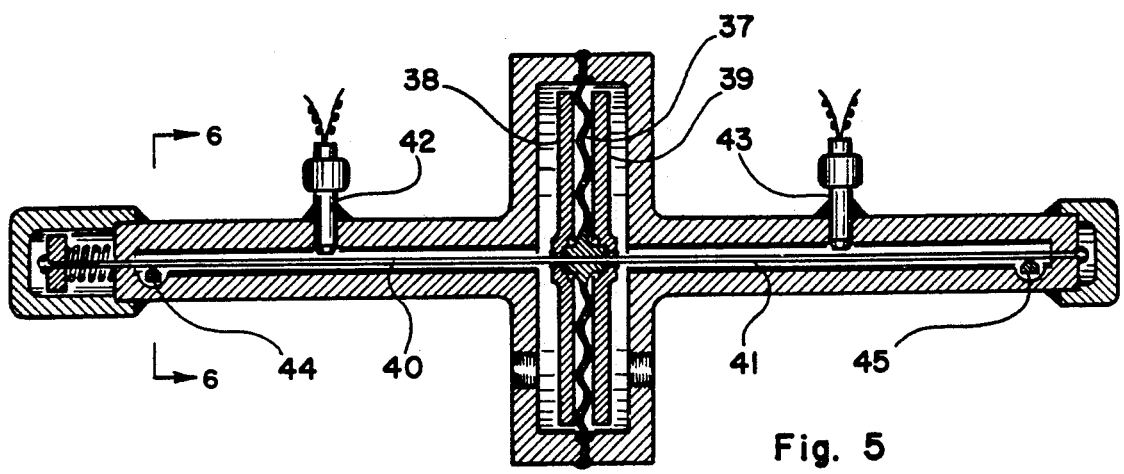
FIG. 5 illustrates a cross section of a further embodiment of the digital pressure sensor of the present invention.

In FIG. 1 there is illustrated a cross section of an embodiment of the digital pressure sensor constructed in accordance with the principles of the present invention, which cross section is taken along the central axis of the structure. The body 1 of the pressure sensor includes a circular cylindrical cavity 2 of a large diameter disposed at the midsection and a pair of circular cylindrical cavities 3 and 4 having a smaller diameter, which extend from the circular cylindrical cavity 2 in two opposite directions in a concentric relationship. The extremities of the circular cylindrical cavities 3 and 4 are sealed off by a pair of caps 5 and 6, respectively. The circular cylindrical cavity 2 is divided into two pressure receiving chambers 7 and 8 by a deflective partition 9 such as a diaphragm or thin disc that can be deflected over a small distance from the neutral equilibrium position with very little resistance by a pressure difference thereacross. The pressure receiving chambers 7 and 8 respectively include pressure line ports 10 and 11 disposed through the rigid wall thereof. The deflective partition 9 is supported by a pair of wires under tension 12 and 13 extending therefrom in two opposite directions generally perpendicular to the deflective partition 9. One extremity of the tension wire 12 opposite to the extremity anchored to the deflective partition 9 is secured to an anchoring member 14 threadedly connected to a combination of nut and lock nut 15, which combination is retained in the extremity of the cylindrical cavity 3 in a spring biased arrangement wherein the coil spring 16 provides the initial tension on the wires 12 and 13. One extremity of the tension wire 13 is secured to a threaded anchoring member 17 with a lock nut 18, that is threadedly connected to the extremity of the cylindrical cavity 4. By adjusting the position of the anchoring member 17, one can set the position of the central portion of the deflective partition 9 in such a way that the deflective partition 9 takes the neutral equilibrium position of zero internal stress when the pressures on two opposite sides thereof are equal. A pair of electromagnetic means 19 and 20 respectively affixed to and extending through the walls of the cylindrical cavities 3 and 4 induce lateral vibrations on the two tension wires 12 and 13 intermittently and measures the natural frequencies of vibrations thereof. The natural frequencies $f_1$ and $f_2$ detected by the frequency analyzer circuits 21 and 22 are fed to the electronic data processor 23 that determines the pressure difference $\Delta p$ across the deflective partition 9 from those natural frequencies $f_1$ and $f_2$. It should be mentioned that the cylindrical cavities 2, 3 and 4 may have cross sections different from circular geometry and that the inclusion of the adjustable anchoring means which secure the two extremities of the tension wires 12 and 13 is a matter of design rather than an absolute requirement. It should be mentioned that the fluid medium with pressure being measured by the digital pressure sensor of the embodiment shown in FIG. 1 fills up one or both pressure receiving chambers 3 and 4 and, consequently, one or both tension wires 12 and 13 are immersed in the fluid medium, which condition can be detrimental to the vibration of the tension wires when the fluid medium has dynamic viscosity of a high value. Therefore, the embodiment of the digital pressure sensor shown in FIG. 1 is ideal for measuring pressure of gaseous medium. It should be understood that the electromagnetic means 19 and 20 have dual functions, which include the intermittent excitation of the vibration of the tension wires and the detection of the natural frequencies of the vibrations produced by each excitation. In place of such dual function electromagnetic means, one may employ two separate electromagnetic means with single function wherein the first electromagnetic means induces vibrations on the tension wires and the second electromagnetic means detects the natural frequencies of the vibrations.

In FIG. 2 there is illustrated a mode of vibrations imposed on each of the two tension wires 12 and 13 by each of the two electromagnetic means 19 and 20. Each of the impulses 24, 25, etc. applied at regular time intervals produces the vibration of the tension wire at its natural frequency of primary mode as illustrated by the decaying harmonic oscillations 26, 27, etc. respectively following the excitations 24, 25, etc. The electromagnetic means 19 and 20 functioning as a position or velocity sensor pick up the harmonic oscillations of the tension wires. The natural frequencies of the harmonic oscillations of the tension wires are determined by analyzing the electric signals from the electromagnetic means 19 and 20.

It is well known that the natural frequency f of the harmonic oscillation of a wire under tension T is given by equation $$f = \frac{1}{2L} \sqrt{\frac{T}{\rho}}, \tag{1}$$

where L is the length of the wire and $\rho$ is the linear density of the wire. The difference in the tensions on the two wires 12 and 13 is equal to the pressure difference across the deflective partition 9 times the surface area thereof, which relation in conjunction with the relation given by equation (1) yields the equation $$p_2 - p_1 = \frac{4\rho}{A} [(f_2 L_2)^2 - (f_1 L_1)^2], \tag{2}$$

where p is the fluid pressure, A is the surface area of the deflective partition 9 exposed to the fluid medium, and the subscripts stand for quantities belonging to two opposite sides of the deflective partition 9. The relationship given by equation (2) is a theoretical one. The actual relationship between the differential pressure across the deflective partition 9 and the natural frequencies of the two tension wires can be written in the form $$p_2 - p_1 = C \cdot \frac{4\rho}{A} [(f_2 L_2)^2 - (f_1 L_1)^2], \tag{3}$$

where C is a constant of proportionality that is determined by the calibration process of the digital pressure sensor, wherein C may be an absolute constant or a very weak function of the natural frequencies. If the first side of the deflective partition 9 is evacuated to complete vacuum, the digital pressure sensor measures absolute pressure given by equation $$p_2 = C \cdot \frac{4\rho}{A} [(f_2 L_2)^2 - (f_1 L_1)^2]. \tag{4}$$

When the length of the two wires 12 and 13 are matched to one another, equation (3) reduces to $$p_2 - p_1 = C \cdot \frac{4\rho}{A} L^2 [(f_2)^2 - (f_1)^2]. \tag{5}$$

As the differential pressure or absolute pressure is measured in terms of difference in the square of the frequencies, the digital pressure sensor of the present invention does not rely on any initial reference conditions of the mechanical arrangement as well as that of the characteristics of the electronic circuits. As a consequence, the accuracy of the measurement is not affected by the drift of the mechanical and electronic characteristics.

In FIG. 3 there is illustrated another mode of vibrations imposed by the electromagnetic means 19 and 20 at regular intervals, which are employed in detecting the natural frequencies of vibrations of the two tension wires. In this mode of imposed vibrations, the electromagnetic means imposes forced vibrations in a mode of frequency sweep; wherein the frequency generating the maximum amplitude $V_{max}$ is equal to the natural frequency. Once the natural frequencies of the two tension wires 12 and 13 are determined by the frequency sweep mode, the differential pressure is determined by the same equations as that given by (3) or (5). It should be mentioned once more that the detection of the natural frequencies from the vibration modes shown in FIGS. 2 or 3 can be implemented by a single dual function electromagnetic means that imposes and detects the vibration or by two single function electromagnetic means wherein one imposes the vibration while the other detects the vibration.

In FIG. 4 there is illustrated another cross section of the digital pressure sensor of the present invention that has essentially the same construction as the embodiment shown in FIG. 1 with one exception, which is the inclusion of two deflective partitions of smaller diameter 28 and 29 isolating the two pressure receiving compartments 30 and 31 from the two cylindrical cavities 32 and 33 housing the two tension wires 34 and 35, respectively, wherein the three deflective partitions are connected to each other by an axial member such as the extension of the tension wires 34 and 35. In this embodiment, the differential pressure is given by equation $$p_2 - p_1 = C \cdot \frac{4\rho}{A_L - A_S} [(f_2 L_2)^2 - (f_1 L_1)^2], \quad (6)$$

where $A_L$ is the surface area of the large deflective partition 36 and $A_S$ is the surface of the smaller deflective partition 28 or 29. Equation (6) results directly from equation (3) when (A) is substituted by $(A_L - A_S)$. In the embodiment shown in FIG. 4, the tension wires 34 and 35 are not immersed in the fluid with pressure under measurement, as the tension wires 34 and 35 are housed in the isolated cylindrical cavities 32 and 33 which may be evacuated to vacuum or open to the ambient atmosphere. The digital pressure sensor of this particular embodiment is ideal for all fluids independent of the fluid viscosity.

In FIG. 5 there is illustrated a cross section of a further embodiment of the digital pressure sensor of the present invention having essentially the same construction as the embodiment shown in FIG. 1 with two exceptions. Firstly, the deflective partition 37 is sandwiched between a pair of rigid discs 38 and 39 centrally supported by the two tension wires 40 and 41, respectively, which rigid discs 38 and 39 prevent local deflection of the deflective partition 37 under differential pressure, while presenting little resistance against the transfer of the pressure loading on the deflective partition 37 to the differential tension between the two tension wires 40 and 41. Secondly, the electromagnetic means 42 and 43 have a single function of imposing vibrations on the two tension wires 40 and 41, as the vibrations of the two tension wires 40 and 41 are respectively detected by a pair of force sensors respectively including force transmitter members 44 and 45, which are under pressurized contacts with the two tension wires 40 and 41, respectively. It should be understood that the particular embodiment shown in FIG. 5 may be modified to include a pair of electromagnetic means having dual functions of imposing and sensing vibrations as described in conjunction with FIG. 1 or to include an additional pair of deflective partitions of smaller diameter as included in the embodiment shown in FIG. 4, each of which deflective partition of smaller diameter may be reinforced by one rigid disc disposed adjacent to one side thereof opposite to the fluid receiving chamber or by two rigid discs disposed adjacent to the two sides thereof.

Figure 6:
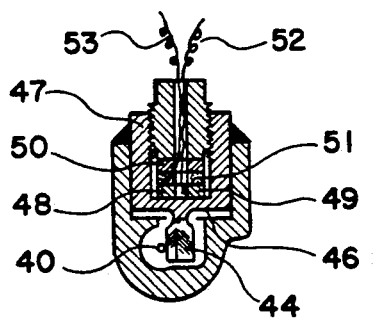
FIG. 6 illustrates another cross section of the embodiment shown in FIG. 5.

In FIG. 6 there is illustrated another cross section of the embodiment shown in FIG. 5, which cross section is taken along plane 6—6 as shown in FIG. 5, that illustrates an embodiment of a force detector usable in conjunction with the digital pressure sensor of the present invention. The force transmitter member 44 under a pressurized contact with the tension wire 40 extends from a thin flange 46 forming a portion of wall of the transducer container vessel 47 that houses two semicircular Piezo-electric elements 48 and 49 under a pressurized contact with the thin flange 46 and a circular Piezo-electric element 50 stacked on top of an insulating disc 51 separating the circular Piezo electric element 50 from the two semicircular Piezo electric elements 48 and 49. The two semicircular Piezo electric elements 48 and 49 having two opposing polarities are disposed in a symmetric arrangement about a plane including the central axis of the force transmitter member 44 and parallel to the tension wire 40, while the circular Piezo electric element 50 is disposed symmetrically about the aforementioned plane. As a consequence, the electric wire 52 connected to both of the semicircular Piezo electric elements 48 and 49 transmits electromotive force generated by the vibration of the tension wire 40 and by the noise resulting from the vibration of the housing of the pressure sensor, while the electrical wire 53 connected to the circular Piezo electric element 50 transmits electromotive force generated by noise only. Therefore, the noises can be cancelled and net signals representing the vibration of the tension wire 40 can be extracted by combining the signals transmitted through the two wires 52 and 53 in an appropriate manner. The Piezo electric force sensor is one of many sensors usable in sensing the vibration of the tension wire. When the cylindrical cavity housing the tension wire is not evacuated to a complete vacuum, a microphone may be employed as a vibration detector.

Figure 7:
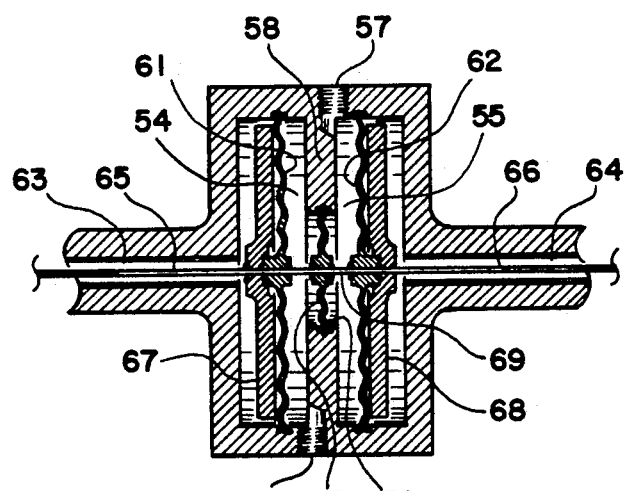
FIG. 7 illustrates a cross section of yet another embodiment of the digital pressure sensor of the present invention.

In FIG. 7 there is illustrated yet another embodiment of the combination of two pressure receiving chambers, which combination of the pressure receiving chambers may be employed in place of the pressure receiving chambers shown in FIGS. 1, 4 or 5 in constructing the digital pressure sensor illustrated in FIGS. 1, 4 or 5. The two pressure receiving chambers 54 and 55 respectively including two pressure ports 56 and 57 are separated from one another by a rigid annular wall 58 with a central circular opening 59 sealed off by a deflective partition of small diameter 60. The extremities of the two pressure receiving chambers 54 and 55 opposite to the common partition respectively include the two deflective partitions of large diameters 61 and 62, which isolate the cylindrical cavities 63 and 64 respectively housing the tension wires 65 and 66 from the pressure receiving chambers 54 and 55. The deflective partitions of large diameter 61 and 62 may respectively be reinforced by the rigid discs 67 and 68 disposed adjacent to the sides of the deflective partitions of large diameter 61 and 62 opposite to the sides exposed to the fluid pressure, which rigid discs 67 and 68 are centrally secured to the tension wires 65 and 66, respectively. The three deflective partitions 61, 60 and 62 are inter-connected by an axial structural member 69, that may be an extension of the two tension wires 65 and 66. The digital pressure sensor employing the arrangement of the pressure receiving chambers shown in FIG. 7 operates on principles described by equation (6).

Figure 8:
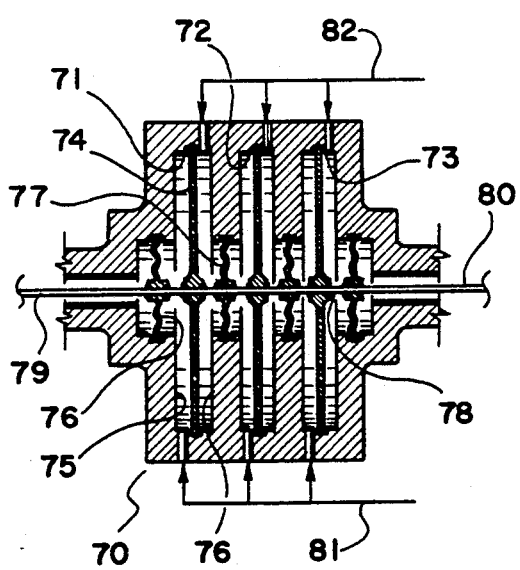
FIG. 8 illustrates a cross section of yet a further embodiment of the digital pressure sensor of the present invention.

In FIG. 8 there is illustrated a cross section of yet a further embodiment of the combination of pressure receiving chambers, which is for constructing a digital pressure sensor of the present invention that has a high sensitivity. This combination includes a plurality of pairs of the pressure receiving chambers arranged in series, wherein each of the pairs of the pressure receiving chamber has essentially the same construction as the combination included in the embodiment shown in FIG. 4. The midsection of the pressure sensor body 70 includes a plurality of circular cylindrical cavities of large diameter 71, 72, 73, etc., wherein each of the circular cylindrical cavities of large diameter divided into two pressure receiving chambers by a deflective partition of large diameter 74 includes two annular rigid end walls 75 and 76 respectively including deflective partitions of small diameter 76 and 77 disposed in a coaxial relationship. The plurality of the deflective partitions of large diameter and the plurality of the deflective partitions of small diameter disposed in an alternating arrangement in a coaxial relationship are connected to each other by an axial support member 78 which may be the extension of the tension wires 79 and 80 extending from the two extremities of the combination of the deflective partitions in two opposite directions in an arrangement as illustrated by the corresponding members shown in FIGS. 1, 4 or 5. The plurality of the first pressure receiving chambers disposed at one side of the deflective partitions of large diameter are connected to a first common pressure line 81, while the plurality of the second pressure receiving chambers disposed at the other side of the deflective partitions of large diameter opposite to the one side thereof are connected to a second common pressure line 82. The differential pressure is determined by equation $$p_2 - p_1 = C \cdot \frac{4\rho}{N(A_L - A_s)} [(f_2 L_2)^2 - (f_1 L_1)^2], \quad (7)$$

where N is the number of the circular cylindrical cavities of large diameter, and $A_L$ and $A_S$ respectively stand for the surface area of the deflective partition of large diameter and that of small diameter. It is recognized from equation (7) that the sensitivity of the differential or absolute pressure measurement is inversely proportional to the number of the circular cylindrical cavities of large diameter.

Figure 9:
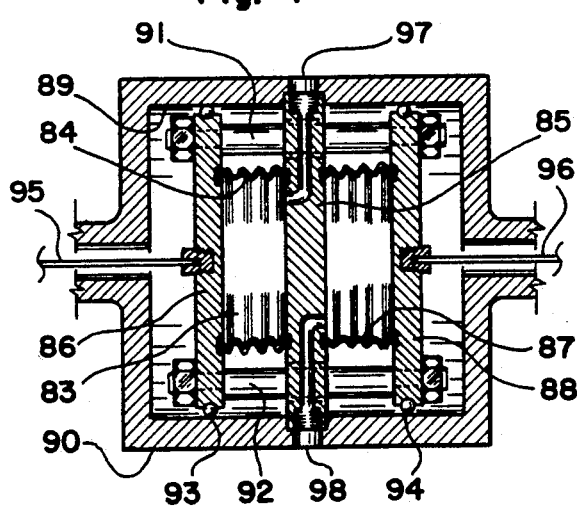
FIG. 9 illustrates a cross section of still another embodiment of the digital pressure sensor of the present invention.

In FIG. 9 there is illustrated a cross section of still another embodiment of the combination of two pressure receiving chambers, which may be employed in the construction of the digital pressure sensor of the present invention in place of the corresponding combination shown in FIGS. 1, 4 or 5. The first pressure receiving chamber 83 includes a bellow 84 extending from a fixed rigid partition 85 to a sliding rigid disc 86, while the second pressure receiving chamber includes a bellow 87 extending from the common fixed rigid partition 85 to a sliding rigid disc 88. The two sliding rigid discs 86 and 88 contained in a cylindrical cavity 89 included in the pressure sensor body 90 in a sliding relationship are rigidly connected to one another by a plurality of threaded rods 91, 92, etc. extending through clearance holes disposed through the common fixed rigid disc 85. The sliding motion of the assembly of the rigid discs 86 and 88 are enhanced by ball bearings 93 and 94 disposed along the circumference thereof. The sliding rigid discs 86 and 88 are respectively connected to two tension wires 95 and 96 disposed in an arrangement as shown in FIGS. 1, 4 or 5. The two pressure ports 97 and 98, which are respectively open to the first and second pressure receiving chambers, are routed through the common fixed rigid disc 85. The digital pressure sensor illustrated in FIG. 9 operates on principles set forth by equation (3) wherein the surface area A exposed to the fluid is the area of the sliding disc enclosed within the bellow, which area is equal to the cross section area of the cylindrical space bounded by the bellow.

In FIG. 10 there is illustrated a cross section of still a further embodiment of the combination of two pressure receiving chambers, which may be employed in the construction of the digital pressure sensor of the present invention in place of the corresponding combination included in the embodiment shown in FIG. 1, 4 or 5. The midsection of the pressure sensor body 99 includes a cylindrical cavity of large diameter 100 that is divided into two compartments by a sliding rigid disc 101 wherein the sliding engagement between the circumference of the rigid disc 101 and the cylindrical surface of the cavity 100 is provided by the ball bearing 102 disposed following the circumference of the rigid disc 101. The first annular pressure receiving chamber 103 is provided by a first pair of bellows 104 and 105 having two different diameters and disposed in a coaxial relationship with respect to the cylindrical cavity 100, which bellows extend from one end wall 106 of the cylindrical cavity to the sliding rigid disc 101. The second pressure receiving chamber 107 is provided by a second pair of bellows 108 and 109 arranged in the same way as the first pair of bellows 104 and 105, which bellows extend from the other end wall 110 of the cylindrical cavity to the sliding rigid disc 101. The two tension wires 111 and 112 arranged in the same way as the corresponding elements shown in the embodiment illustrated in FIG. 1, 4 or 5 extend from two opposite sides of the sliding rigid disc 101 in two opposite directions. The pressure ports 113 and 114, which are respectively open to the two pressure receiving chambers 103 and 107, are disposed through the two end walls 106 and 110 of the cylindrical cavity 100, respectively. The digital pressure sensor illustrated in FIG. 10 measures the differential or absolute pressure in accordance with equation (3), wherein the surface area A is the area of the annular surface of the sliding rigid disc 101 bounded by two bellows 104 and 105. The space intermediate the cylindrical wall of the cylindrical cavity 100 and the bellows of large diameter 105 and 109 may be filled with a lubricating liquid.

In FIG. 11 there is illustrated a cross section of an embodiment of the combination of two pressure receiving chambers comprising a pair of pan cake type diaphragm capsules, which combination has essentially the same construction as the embodiment shown in FIG. 9 with one exception being that the two pressure receiving chambers are now provided by a pair of pan cake type diaphragm capsules 115 and 116 respectively disposed intermediate the first sliding rigid disc 117 and the fixed rigid wall 118 and intermediate the fixed rigid wall 118 and the second sliding rigid disc 119 in an axially confined relationship. The pair of pressure ports 120 and 121 disposed through the common fixed rigid wall 118 are connected to the centrally located openings of the diaphragm capsules 115 and 116, respectively. The digital pressure sensor shown in FIG. 11 operates on the same principles as that illustrated in FIG. 9.

In FIG. 12 there is illustrated a cross section of an embodiment of the combination of two pressure receiving chambers comprising a pair of doughnut type diaphragm capsules, which is arranged in essentially the same way as the embodiment shown in FIG. 10 with one exception being that, in place of the pair of the combination of the inner and outer bellows, a pair of doughnut type diaphragm capsules 122 and 123 provide the two pressure receiving chambers, respectively. The two doughnut type diaphragm capsules 122 and 123 are respectively disposed intermediate one end wall 124 of the cylindrical cavity 125 and the sliding rigid disc 126 and intermediate the sliding rigid disc 126 and the other wall 127 of the cylindrical cavity 125 in an axially confined relationship. The pressure ports 128 and 129 respectively disposed through the end walls 124 and 127 are connected to the openings of the two diaphragm capsules 122 and 123, respectively. The digital pressure sensor shown in FIG. 12 operates on the same principles as that shown in FIG. 10.

The detailed structure employed in the construction of the pressure receiving chambers should be considered as a matter design, for the skilled in the art will provide many other designs different from the particular arrangements shown in the illustrative embodiments. The novel and patentable principles of the present invention is the methodology that teaches how to measure differential or absolute pressure without relying on any deformation or deflection of mechanical elements created by the pressure being measured. The digital pressure sensor of the present invention measures the fluid pressure by measuring stress created thereby rather than strain. While the principles of the present invention have now been made clear by the illustrative embodiments, there will be immediately obvious to the skilled in the art many modifications in the structures, arrangements, proportions, elements and materials, which are particularly adapted to the specific working environments and operating conditions in the practice of the invention without departing from those principles.

I claim:

1. A pressure measuring apparatus comprising in combination:

(a) a body including a first pressure receiving chamber including a port and at least one deflective end wall for receiving and containing fluid under a pressure therewithin, and a second pressure receiving chamber including a port and at least one deflective end wall for receiving and containing fluid under another pressure therewithin;

(b) a first elongated tension member with one extremity secured to said at least one deflective end wall of the first pressure receiving chamber and extending therefrom in a first direction through a first cavity separated from the first pressure receiving chamber in a leak-proof manner, and anchored to the body at the other extremity opposite to said one extremity;

(c) a second elongated tension member with one extremity secured to said at least one deflective end wall of the second pressure receiving chamber and extending therefrom in a second direction opposite to said first direction through a second cavity separated from the second pressure receiving chamber in a leak-proof manner, and anchored to the body at the other extremity opposite to said one extremity;

(d) means for mechanically linking said one extremity of the first elongated tension member to said one extremity of the second elongated tension member in a tension transmitting relationship, wherein difference in the fluid pressure between the first and second pressure receiving chamber produces difference in tension between the first and second elongated tension members;

(e) means for generating lateral vibrations of the first and second elongated tension members; and (f) means for detecting natural frequencies of the lateral vibrations of said first and second elongated tension members;

wherein the difference in the fluid pressure between the first and second pressure receiving chambers are determined from the natural frequencies of the lateral vibrations of said first and second elongated tension members.

2. The combination as set forth in claim 1 wherein said combination includes data processing means that determines differential pressure between the first and second pressure receiving chambers.

3. The combination as set forth in claim 1 wherein the anchoring of said the other extremity of one of the first and second elongated tension members includes a spring bias providing a generally constant tension on said one of the first and second elongated tension members.

4. The combination as set forth in claim 3 wherein said combination includes data processing means that determines differential pressure between the first and second pressure receiving chambers.

5. The combination as set forth in claim 1 wherein each of said at least one flexible end walls of the first and second pressure receiving chambers includes at least one generally rigid disc backing up said flexible end wall.

6. The combination as set forth in claim 5 wherein said combination includes data processing means that determines differential pressure between the first and second pressure receiving chambers.

7. The combination as set forth in claim 1 wherein each of said deflective end walls comprises a rigid end wall connected to a distensible cylindrical wall of each of said pressure receiving chambers in a leak-proof manner.

8. The combination as set forth in claim 7 wherein said combination includes data processing means that determines differential pressure between the first and second pressure receiving chambers.

9. The combination as set forth in claim 7 wherein the anchoring of said the other extremity of one of the first and second elongated tension members includes a spring bias providing a generally constant tension on said one of the first and second elongated tension members.

10. The combination as set forth in claim 9 wherein said combination includes data processing means that determines differential pressure between the first and second pressure receiving chambers.

11. A pressure measuring apparatus comprising in combination:
  (a) a body including a first pressure receiving chamber including a port and at least one deflective and wall for receiving and containing fluid under a pressure therewithin, and a second pressure receiving chamber including a port and at least one deflective end wall for receiving and containing fluid under another pressure therewithin;
  (b) a first elongated tension member with one extremity secured to said at least one deflective end wall of the first pressure receiving chamber and extending therefrom in a first direction through a first cavity separated from the first pressure receiving chamber in a leak-proof manner, and anchored to the body at the other extremity opposite to said one extremity; wherein said first cavity is evacuated and sealed off;
  (c) a second elongated tension member with one extremity secured to said at least one deflective end wall of the second pressure receiving chamber and extending therefrom in a second direction opposite to said first direction through a second cavity separated from the second pressure receiving chamber in a leak-proof manner, and anchored to the body at the other extremity opposite to said one extremity; wherein said second cavity is evacuated and sealed off;
  (d) means for mechanically linking said one extremity of the first elongated tension member to said one extremity of the second elongated tension member in a tension transmitting relationship, wherein difference in the fluid pressure between the first and second pressure receiving chambers produces difference in tension between the first and second elongated tension members;
  (e) means for generating lateral vibrations of the first and second elongated tension members; and
  (f) means for detecting natural frequencies of the lateral vibrations of said first and second elongated tension members;
wherein the difference in the fluid pressure between the first and second pressure receiving chambers is determined from the natural frequencies of the lateral vibrations of said first and second elongated tension members.

12. The combination as set forth in claim 11 wherein said combination includes data processing means that determines differential pressure between the first and second pressure receiving chambers.

13. The combination as set forth in claim 11 wherein each of said deflective end walls comprises a rigid end wall connected to a distensible cylindrical wall of each of said pressure receiving chambers in a leak-proof manner.

14. The combination as set forth in claim 13 wherein said combination includes data processing means that determines differential pressure between the first and second pressure receiving chambers.

* * * * *